July 14, 1931.  L. H. DRAEGER  1,814,026
CONVEYER SYSTEM
Original Filed May 27, 1927   2 Sheets-Sheet 1
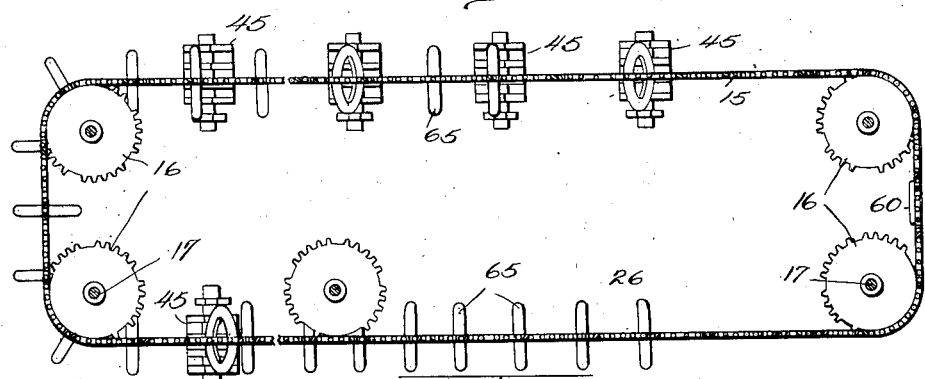
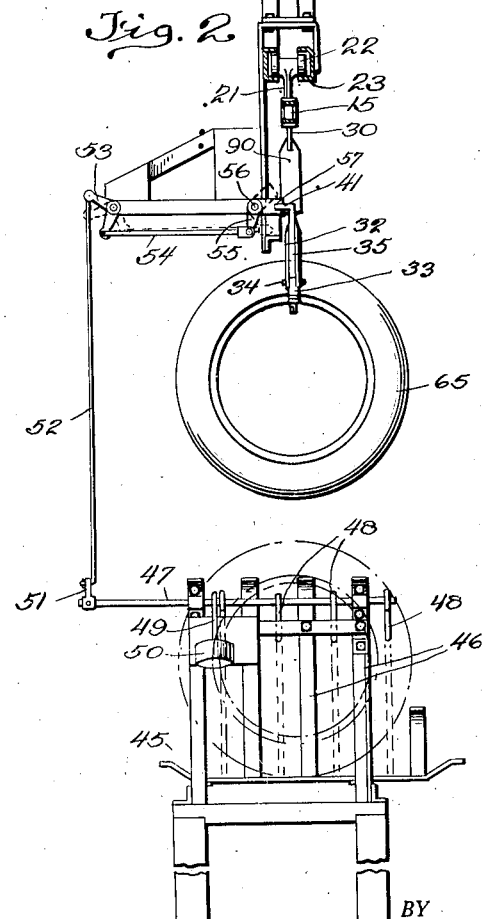
INVENTOR.
L. H. Draeger
BY
ATTORNEYS

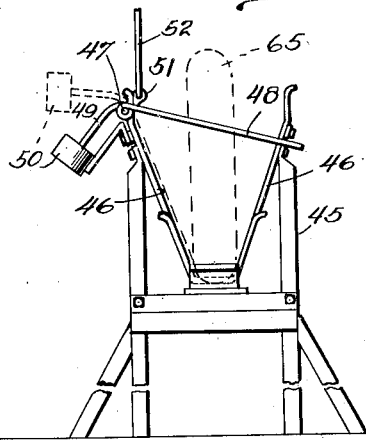
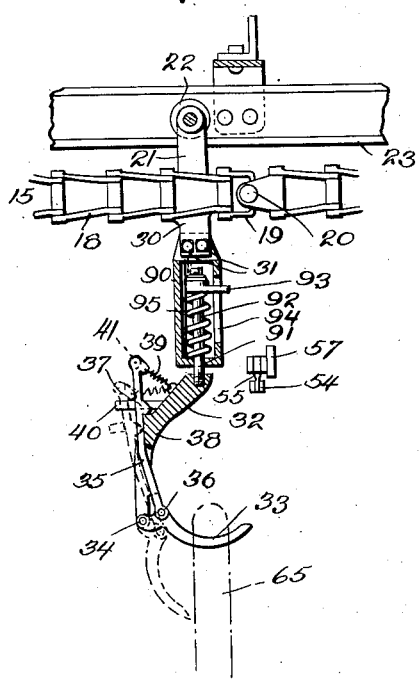
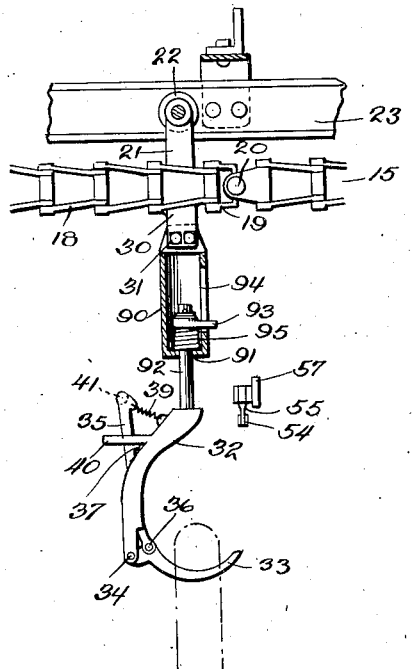

Patented July 14, 1931

1,814,026

UNITED STATES PATENT OFFICE

LLOYD H. DRAEGER, OF MILWAUKEE, WISCONSIN, ASSIGNOR TO CHAIN BELT COMPANY, OF MILWAUKEE, WISCONSIN, A CORPORATION OF WISCONSIN

CONVEYER SYSTEM

Original application filed May 27, 1927, Serial No. 194,750. Divided and this application filed July 28, 1928. Serial No. 295,953.

The invention of this case (which is a division of application 194,750 filed May 27, 1927, for conveyer systems) relates to conveyer systems of the suspended trolley type and has for its object to provide improved means for supporting in transit the articles to be conveyed, and also provide improved means for the delivery of such articles, such means being arranged to deliver articles at different stations according to their weight.

In the accompanying drawings illustrating the invention—

Fig. 1 is a diagrammatic plan view of a conveyer system constructed in accordance with the present invention.

Fig. 2 is a transverse sectional elevation of the conveyer.

Fig. 3 is an elevation illustrating one of the receiving stations.

Fig. 4 is an enlarged view partly in vertical section showing in detail one of the supporting carriers for the articles to be transported; and Fig. 5 is a similar view to Fig. 4, except that the carrier is represented as transporting a heavier article than is the carrier of Fig. 4.

Referring to the drawings it will be noted that the conveyer comprises an endless chain 15 that passes around and engages with the sprocket wheels 16 carried by suitably journaled vertical shafts 17. The said chain may be of any suitable construction, that illustrated being made up of links 18 united by vertically disposed pivots and certain other links, 19, that are connected into the chain by horizontally disposed pivots 20. A chain such as described permits the conveyer to be flexed in various directions and to travel along practically any desired course.

Certain of the chain links are provided with upwardly extending arms 21 which carry rollers 22 adapted to move in engagement with suitable trackways 23. At one or more places along the course of the conveyer are located loading stations, indicated generally in Fig. 1 by 26, where the articles to be transported, such for instance as casings for automobile tires, 65, are placed upon the supports or carriers of the conveyer, from which they are delivered, automatically, to various receiving stations, 45, located along the course of the conveyer. Certain links of the chain, preferably those carrying the arms 21, are provided with depending arms 30 to which are secured by bolts 31 the main body members 32 of the trip hooks that serve as the supporting and conveying elements for the articles transported. To the lower ends of the members 32 are pivoted, at 34, the curved fingers or hooks 33. To the latter are pivotally connected at 36 the latch members 35. Each latch member is provided with a projection 37 that is adapted to engage with a shoulder 38 formed on the main body member 32, the projection being maintained in engagement with the shoulder by a spring 39. The parts are so designed that when the projection 37 engages with the shoulder 38 the hook 33 will be maintained in position to receive and support an article to be transported, as represented in Figs. 4 and 5.

The body 32 of the trip hook is preferably provided with a pair of spaced guide fingers 40 for preventing lateral movement of the latch 35, and the latter is provided at its upper end with an angularly extending toe 41 that is adapted to engage with a suitable trip such as 57 that operates to release hook and permit automatic delivery of the article transported, as will be described.

The system illustrated is represented as being adapted to have the articles transported, such as automobile tire casings, placed upon the hooks 33 by hand as such hooks pass the loading station 26, although other means may be provided for loading the carrier if found desirable.

Each delivery station preferably comprises a rack 45 having inclined sides 46, herein shown as comprising spaced slats. In one of the sides of the rack is journaled a rock shaft 47 carrying a plurality of spaced rods 48 that, whenever the rack is unoccupied, extend across the upper portion of the rack, as best represented in Fig. 3. Said rock shaft 47 is also provided with an arm 49 carrying a weight 50 which normally maintains the rods 48 in the full line positions illustrated in Figs. 2 and 3—that is, extending across the rack. The rock shaft is further provided with a rigid arm 51 to which is connected an upwardly extending link 52, the upper end of which is connected with a bell crank lever 53, that, in turn, is connected by link 54 with an arm 55 extending from a jack shaft 56 mounted adjacent to the trackway 23. The jack shaft 56 carries a trip arm 57 that is adapted to be moved into and out of the path of travel of the angular extensions or toes 41 of the latch members 35 of the article carriers which have already been described, the trip arms operating when they engage with the projections 41 to trip the latches and allow the supporting hooks 33 to drop, as indicated in dotted lines Fig. 4, and release the article 65, which thereupon falls into a rack of a receiving station. At some suitable point along the conveyer, preferably between the last receiving station 45 and the loading station 26, there is provided a cam 60 for engaging with the projections 41 and resetting the trip hooks.

In the operation of a conveyer such as described, as the article carrying hooks 33 approach a loading station the articles are placed thereon, either manually or automatically, and are thence conveyed to the receiving stations, where they are automatically deposited, through the tripping of the latch members 35 by the trip arms 57. It being assumed that none of the receiving stations has received a tire (this implying that the rods 48 lie across each receiving rack 45, as represented in Fig. 3, and all trip arms 57 stand in position to engage with the releasing projections 41 of the latch members 35), as the first loaded carrier approaches the first receiving station the projection 41 of the carrier comes into engagement with the trip arm 57 of said first station, releases the latch 35, and permits the hook 33 to move into the position represented in dotted lines in Fig. 4, thereby delivering the article 65 into the rack 45. As the article enters the rack it engages with the rods 48, which are thereby forced downwardly and into the position indicated in dotted lines in Fig. 3, and this in turn moves the trip arm into the position represented in dotted lines in Fig. 2, where it is out of the path of the projections 41 of the article carriers and where it remains so long as the rack is occupied by the article 65. It thus results that when the next hook carrying an article passes the receiving station just referred to, and now occupied, the latch 35 is not operated, and the carrier with its load passes on until it reaches the next receiving station unoccupied where the latch is automatically tripped and the load delivered as has been described. It follows that as long as a particular receiving station is occupied by a delivered article the tripping arm 57 associated with that station will be moved out of the path of travel of the latch projections 41 of the conveyer so that no additional articles will be deposited at that particular station until the article occupying the rack has been removed. Of course if all of the receiving stations 45 are occupied the articles being carried will not be delivered but will be continuously moved throughout the path of travel of the conveyer until the rack of some receiving station is empty, whereupon the article carried will be there deposited.

Whenever one of the tire carriers is tripped to release its load it continues to travel in tripped condition with its hook 33 depending as represented in dotted lines, Fig. 4, until it reaches the resetting member 60, where the hook 33 is automatically restored to receiving condition before reaching the loading station 26.

The parts thus far described are common to the apparatus herein presented and that shown and claimed in the aforesaid application 194,750 already referred to and therefore need not be described more in detail.

In order to provide for the selective delivery of articles, such as tire casings for example, of different sizes and weights, at different predetermined delivery stations 45, that is to deliver the casings of a certain size and weight at a certain station, other casings of other sizes and weights at another station, etc., the trip hook or article carrier herein illustrated is employed. Referring particularly to Figs. 4 and 5 it will be seen that the downwardly depending arms 30 are each provided with a cage member 90 which is apertured at 91 to slidably receive the upwardly projecting stem 92 with which the body member 32 of the trip hook is provided. The stem 92 carries a rigid laterally projecting arm 93, preferably near its upper end, that extends outwardly through a slot 94 formed in the cage member 90 to prevent turning of the parts about the axis of the stem, though permitting vertical movement. A spring 95 surrounds the stem 92 between the arm 93 and the bottom of the cage, which spring serves to hold the supporting hook or article carrier in its uppermost position when freed of an article to be transported, but is compressed to varying degrees when an article to be transported is placed upon the hook 33, the compression depending upon the weight of the article. As represented in Fig. 4 a small and comparatively light tire casing will compress the spring 95 only slightly, whereas a larger and heavier casing such as indicated in Fig. 5 will compress it to a much greater degree.

By the construction just described it is obvious that casings of varying widths will depress the article-carrying trip hooks varying distances so that the projections 41 will travel in different horizontal paths according to the weight of the loads they are called upon to carry, the planes or paths in which the projections 41 travel being at various distances below the track 23 of the conveyer system. It follows therefore that if the various trip arms of the different stations be located in different planes, as represented in Figs. 4 and 5, it is possible to have all the articles of a certain weight delivered at a particular station, while those of different weights pass such station to be tripped at another unloading station. Since the weight of the casings is usually dependent upon the size thereof, it is thus possible to segregate the casings at predetermined stations according to size, although they may be loaded upon the conveyer indiscriminately from a single loading station.

It is obvious that those skilled in the art may vary the details of construction as well as the precise arrangements of parts without departing from the spirit of the present invention, and therefore it is not wished to be limited to the disclosure herein except as may be required by the claims hereof.

What is claimed is:

1. In a conveyer system, a loading station; a conveyer adapted to receive articles of varying weights indiscriminately from said loading station; a plurality of receiving stations; means for selectively releasing articles of predetermined weight upon arrival at said receiving stations; and means for rendering said releasing means inoperative when a station is already occupied.

2. In a conveyer system, a loading station; a plurality of receiving stations; a conveyer element extending from said loading to said receiving stations; a plurality of automatically releasable article carriers, each provided with a tripping element; yielding connections between said article carriers and said conveyer element, whereby articles of varying weights when placed upon said carriers may cause said tripping elements to move into correspondingly varying planes; coacting trip members located at said receiving stations in varying planes to selectively engage said carrier trip elements to release articles of predetermined weights at predetermined stations, and means for rendering any co-acting trip member inoperative when its station is already occupied.

3. In a conveyer system, a loading station; a plurality of receiving stations; a conveyer chain extending from said loading to said receiving stations; cage members carried by said chain; an automatically releasable article carrier having a tripping element slidably carried by each cage member; a spring interposed between each carrier and cage member; and coacting trip members located at said receiving stations in varying planes to selectively engage said carrier trip elements to release articles of predetermined weights at predetermined stations.

4. In a conveying system, an endless conveyer of the suspended trolley type, including a flexible power-transmitting element and trolleys arranged to travel along a stationary track, individual carriers for the articles to be transported; resilient suspension supports for the carriers interposed directly between them and the trolleys, whereby the carriers occupy different positions according to the different weights of the loads they respectively support; receiving stations; and means for releasing from the said carriers the articles transported of a predetermined weight upon arriving at a predetermined station.

5. In a conveyer system, an endless conveyer of the suspended trolley type, including a flexible power transmitting element and trolleys arranged to travel along a stationary track; individual carriers for the articles being transported, the carriers being yieldingly suspended directly from said trolleys, whereby they occupy different positions according to the different weights of the loads they carry; trip means carried by the carriers and movable therewith as the carriers move due to the weights of the loads they carry; receiving stations for articles of different weights; and means at the receiving stations for causing release of the loads transported, arranged to act upon the trip devices of the carriers, the releasing means being located at different levels at the different stations, whereby only carriers with loads of determined weight will be tripped to discharge their loads at the desired stations.

6. In a conveyer system an endless trolley conveyer of the suspended trolley type, including a flexible power-transmitting element and trolleys arranged to travel along a stationary track, individual carriers for the articles being transported, each formed with a cage member containing a spring and an article receiving member supported by the said spring, receiving stations for the articles being transported, each station arranged to receive articles of a determined weight; trip means carried by each carrier and movable therewith accordingly as the spring is compressed by the weight of the article being carried; means at the receiving stations for causing release of the loads being transported, the said releasing means being located at different levels at the different stations and arranged to engage with the trip means of the carriers as they are carried past the releasing means, whereby only carriers with loads of determined weight will be tripped to discharge the loads at the desired stations.

In testimony whereof I affix my signature.

LLOYD H. DRAEGER.